United States Patent
Hemmatpour et al.

(10) Patent No.: US 7,901,637 B2
(45) Date of Patent: Mar. 8, 2011

(54) DEVICE FOR EXHAUST EMISSION PURIFICATION FOR VEHICLES AND PRODUCTION METHOD THEREOF

(75) Inventors: Yousef Hemmatpour, Teheran (IR);
Christian Smatloch, Paderborn (DE);
Axel Hinder, Borchen (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 1190 days.

(21) Appl. No.: 11/404,040

(22) Filed: Apr. 14, 2006

(65) Prior Publication Data
US 2006/0233679 A1   Oct. 19, 2006

(30) Foreign Application Priority Data
Apr. 14, 2005   (DE) .......................... 10 2005 017 378

(51) Int. Cl.
*B01D 50/00*   (2006.01)
(52) U.S. Cl. ......................................... 422/180; 422/177
(58) Field of Classification Search .................. 422/168, 422/171, 177, 180
See application file for complete search history.

(56) References Cited

U.S. PATENT DOCUMENTS

| 3,932,310 A | | 1/1976 | Turner |
| 4,193,793 A | | 3/1980 | Cheung |
| 4,556,543 A | * | 12/1985 | Mochida et al. ............... 422/171 |
| 5,064,609 A | * | 11/1991 | Harada et al. ................... 419/58 |
| 5,254,840 A | * | 10/1993 | Thompson ..................... 219/544 |
| 5,387,399 A | * | 2/1995 | Nishida et al. ................ 422/171 |
| 2003/0165662 A1 | | 9/2003 | Suwabe et al. |
| 2003/0175174 A1 | | 9/2003 | Schneider |
| 2005/0186127 A1 | | 8/2005 | Reck et al. |

FOREIGN PATENT DOCUMENTS

| DE | 198 32 625 A1 | 2/2000 |
| DE | 199 35 276 A1 | 2/2000 |
| DE | 102 52 624 A1 | 4/2004 |
| EP | 0 410 200 A1 | 1/1991 |
| EP | 1 316 686 A2 | 6/2003 |
| EP | 1 346 769 A1 | 9/2003 |
| EP | 1 431 528 A2 | 6/2004 |
| JP | 2-215914 A | 8/1990 |

* cited by examiner

*Primary Examiner* — Tom Duong
(74) *Attorney, Agent, or Firm* — Birch, Stewart, Kolasch & Birch, LLP

(57) ABSTRACT

An exhaust emission purification device including a catalyst body with a plurality of flow channels extending between an intake side and a discharge side of the catalyst body. Further, the catalyst body is formed using a sintered catalyst material.

15 Claims, 2 Drawing Sheets

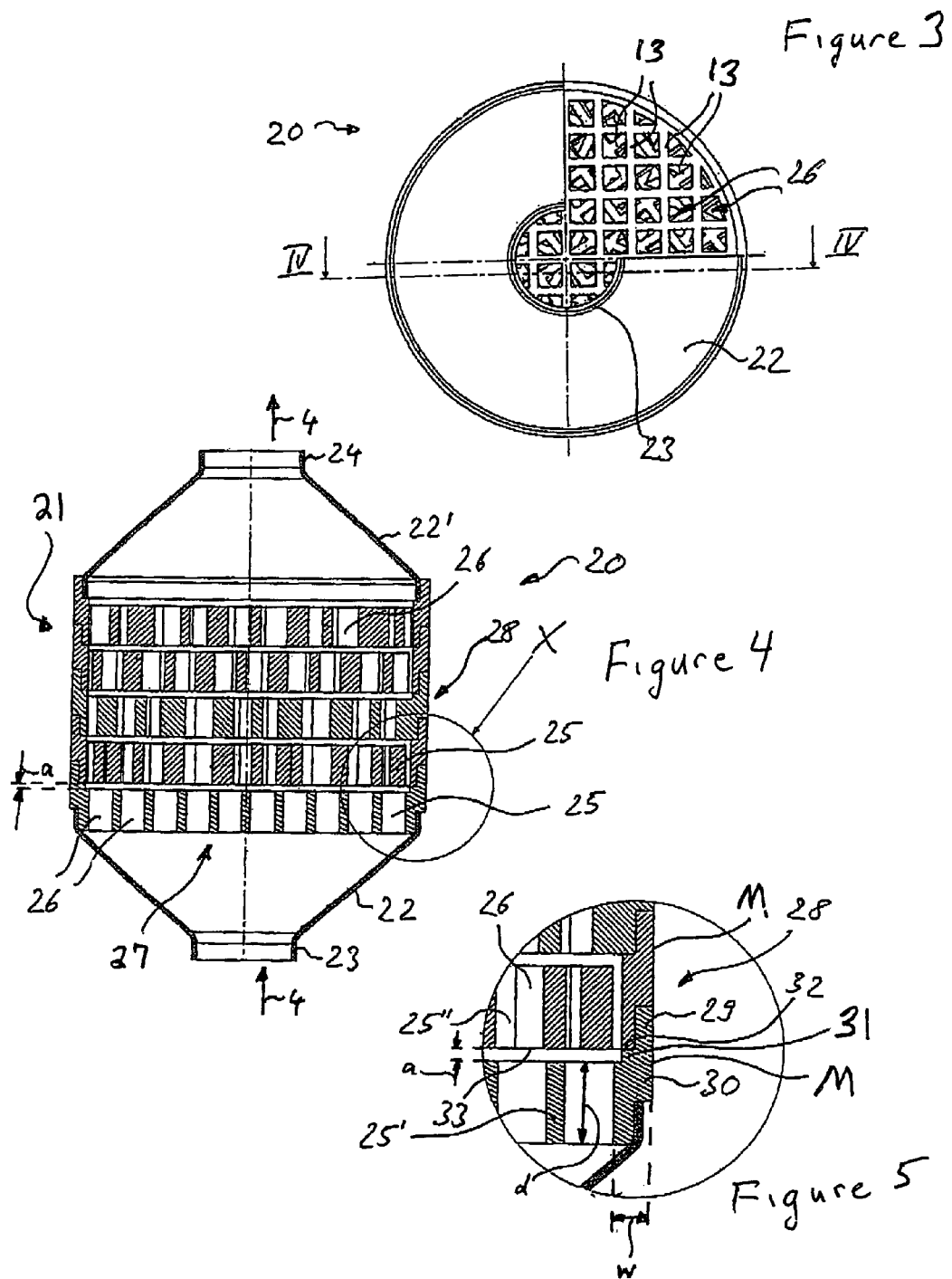

DEVICE FOR EXHAUST EMISSION PURIFICATION FOR VEHICLES AND PRODUCTION METHOD THEREOF

This non-provisional application claims priority to German Patent Application No. DE 10 2005 017 378.0 filed in Germany on Apr. 14, 2005, and which is herein incorporated by reference.

BACKGROUND OF THE INVENTION

1. Field of the Invention

The present invention relates to an exhaust emission purification device having a catalyst body formed of a sintered catalyst material.

2. Description of the Background Art

The German Patent Application DE 102 51 624 A1 illustrates an exhaust gas purification device for vehicles, and which includes a tubular housing and a honeycomb-shaped catalyst body. The honeycomb-shaped catalyst body includes a plurality of flow channels extending from an intake side to a discharge side of the catalyst body to thereby allow an exhaust gas to pass through the catalyst body. Further, the flow channels are formed via a plurality of staggered sheet metal layers. The honeycomb-shaped catalyst body also includes a wash-coat layer (carrier layer), which forms a very large surface and on which a catalyst material such as platinum, rhodium or palladium is dispersed. In addition, the catalyst material is a catalytically active material that reacts with the exhaust gas to thereby reduce noxious substances such as carbon monoxide, unsaturated hydrocarbons, and nitrate monoxide contained in the exhaust gas. Also, the wash-coat layer expedites an oxidation process of the exhaust gas due to its ability to store oxygen.

However, this type of exhaust gas purification device is disadvantageous, because a catalyst material coating layer is always required, irregardless of the material used to make the catalyst body. Further, it is difficult to ensure that the coating layer is even, both in thickness and distribution. In addition, the coating layer tends to flake off in some areas of the catalyst body, which diminishes the catalytic effect. Also, particles present in the exhaust gas form within fine pores of the coating layer thereby sealing off that portion of the coating layer, which reduces the effectiveness of the coating layer.

In addition, the German Patent Application DE 198 32 625 C2 illustrates a method for making a stacked reactor for producing hydrogen from hydrocarbons. In this method, a catalyst material is used make catalyst disks, which are stacked on top of each other. However, this type of stacked reactor is not suitable for use in an exhaust gas purification device for vehicles. Further, the German Patent Publication DE 199 35 276 A1 illustrates a method of producing components by mixing a metal powder mass with a binder. In this method, a preform is made using a metal injection molding process. Subsequently, about 75 percent of a binder is removed from the produced molded component.

SUMMARY OF THE INVENTION

It is therefore an object of the present invention to reduce the cost and increase the life time and efficiency of an exhaust emission purification device.

To achieve this and other objects, the present invention provides a sintered catalyst body made of a uniform and catalytically active catalyst material. The sintered catalyst body ensures an effective catalytic activity of long-term stability and provides a strong mechanical stability. Further, the catalyst body beneficially does not necessarily require a carrier layer (wash-coat layer) or a noble metal layer. Thus, the construction of the catalyst body is relatively homogeneous. In addition, the catalyst material is preferably a pressure-free sintered metal powder. Also, the catalyst body has a strong mechanical strength such that a protective housing is not needed.

In addition, the catalyst body preferably includes a plurality of catalyst disks arranged a predetermined distance from each other in a flow direction of an exhaust gas. That is, the catalyst disks are separated from each other to generate a turbulent flow of the exhaust gas so that the catalytic activity of the catalyst body is improved. In addition, the predetermined distance between adjacent catalyst disks is set relative to a thickness of the catalyst disks such that an improved uniformity of the exhaust gas flow through the catalyst body can be achieved.

Further, according to one aspect of the present invention, at least two catalyst disks are made with different catalyst materials so as to focus a conversion of combustion emissions. For example, a first catalyst disk can be made of a first catalyst material for the conversion of hydrocarbons and carbon monoxide, and a second catalyst disk can be made of a second catalyst material for the conversion of nitric oxide. Thus, a beneficial optimal distribution of the catalyst materials within the catalyst body is achieved.

Further, in another aspect of the present invention, a rim area of the catalyst disks preferably has a collar segment, with which adjacent catalyst disks can be joined together. In addition, the catalyst body is of a compact construction and in some examples does not require an additional housing. Also, at least one catalyst disk may be coated with a noble metal to improve the catalytic activity of the catalyst body.

In another aspect, the present invention provides a method for producing a catalyst body for vehicles, which includes producing a perform by mixing a metal powder mass of a catalyst material with a binder and pouring the mixed material into a molding tool having contours of the catalyst body. Further, the binder is hardened by introducing heat, and the preform is subjected to pressure-free sintering while the binder evaporates.

Thus, the method and device of the present invention is particularly advantageous because the pressure-free sintered catalyst body is compact and mechanically stable. Further, the sintered catalyst body has a porosity that reduces the amount of pollutants in the exhaust gases of vehicles. The effectiveness of the catalyst body is also improved by a plurality of preferably evenly arranged flow channels.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 3 is a front view of a catalyst body in an axial direction in accordance with a second embodiment of the present invention;

FIG. 4 is a longitudinal cross sectional view of the catalyst body along the line IV-IV in FIG. 3; and FIG. 5 is an enlarged partial sectional view of a portion "X" in FIG. 4.

DETAILED DESCRIPTION

Figure 1:
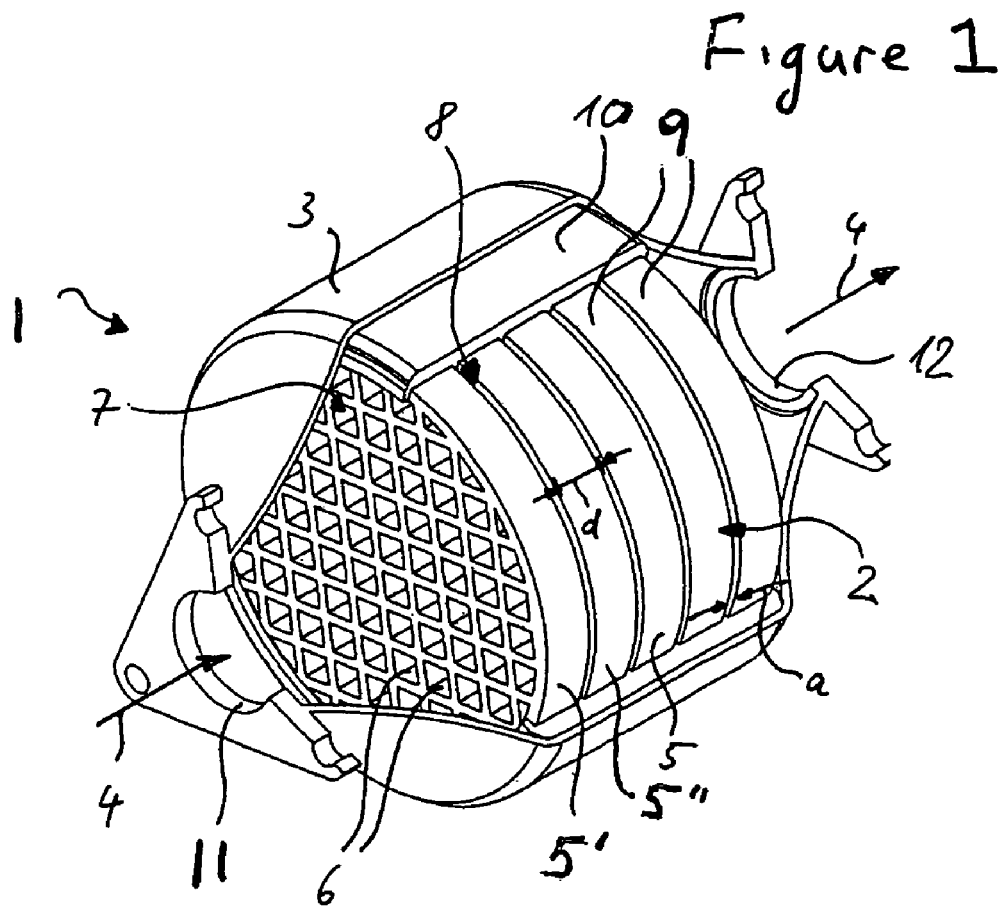
FIG. 1 is an overview illustrating a sectional view of a catalyst body in accordance with a first embodiment of the present invention.
Figure 2:
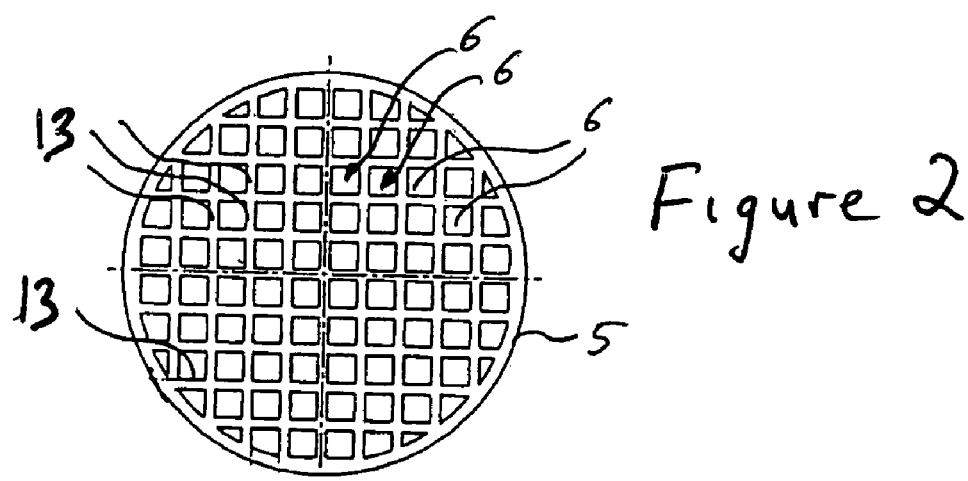
FIG. 2 is a top view of a catalyst disk of the catalyst body illustrated in FIG. 1.

FIGS. 1 and 2 illustrate an exhaust emission purification device 1 for motor vehicles in accordance with a first embodiment of the present invention. As shown, the purification device 1 includes a catalyst body 2 and a housing 3 enclosing the catalyst body 2. Further, the catalyst body 2 includes a plurality of catalyst disks 5 arranged successively in a flow direction 4 of an exhaust gas passing through the purification device 1.

In addition, each catalyst disk 5 includes flow channels 6 between an intake side 7 and a discharge side 8. The flow channels 6 are bounded by channel walls 13 (see in particular FIG. 2) and extend in the flow direction 4. Further, as shown in FIGS. 1 and 2, the flow channels 6 have a rectangular or honeycomb-shaped cross section and are arranged in an even distribution across the cross-sectional area. Thus, the flow channels 6 allow an exhaust gas to flow from the intake side 7 to the discharge side 8 through each catalyst disk 5. In addition, as a result of a catalytic action of the catalyst disks 5, toxic combustion substances such as hydrocarbon, carbon monoxide, and nitric oxide in the exhaust gas are converted to carbon dioxide, water, and nitrogen.

Further, each of the flow channels 6 has an opening surface ranging from 1 $mm^2$ to 1.2 $mm^2$, and a thickness of the channel walls 13 is approximately 0.25 mm. In addition, the catalyst disk 5 preferably has a thickness "d" of 20 mm. Also, the different parameters such as the thickness of the channel walls 13, the cross section of the flow channels 6, and the axial distance "a" between the disks 5 are varied to generate a highest-possible uniformity index of the flow and the highest-possible turbulent flow proportions.

In addition, FIG. 1 illustrates the catalyst body 2 including five catalyst disks 5 separated from each other by the axial distance "a" of approximately 3 mm. This separation causes a turbulent flow of the exhaust gas when the exhaust gas purification system 1 is operated, which improves the catalytic function of the catalytic body 2. Also, as shown in FIG. 1, the catalyst disks 5 are identical in size and have annular peripheral surfaces 9.

The catalyst disks 5 are also held in place in the housing 3 using a heat-resistant mat 10, which is wrapped around the peripheral surfaces 9 of the catalyst disks 5. In addition, as shown in FIG. 1, the housing 3 has an intake connecting piece 11 configured to be connected to a pipe from a motor of the vehicle, and an outlet connecting piece 12 configured to be connected to an exhaust pipe to thereby discharge the converted exhaust gas.

In addition, the housing 3 is preferably made using a sheet metal material. Also, as shown in the partial view of FIG. 1, the mat 10 extends between an interior surface of the housing 3 and the peripheral surfaces 9 of the catalyst disks 5. Thus, the mat 10 has a dampening and insulating effect inside the housing 3. Alternatively, the mat 10 may be a wire mesh to fix and hold the catalyst disks 5 into place.

In addition, the catalyst disks 5 are made of a sintered catalyst material. In more detail, a metal powder mass having a catalytic effect is combined with a binder and is poured or filled into a molding tool. The molding tool also has contours of the catalyst body, that is, the individual catalyst disks, so that a disk-shaped preform is produced. The disk-shaped preform is also provided with the appropriate flow channels 6. Subsequently, the preform is subjected to a heat treatment while still being in the molding tool, whereby the binder hardens due to exposure to heat. Then, the preform can be removed from the molding tool.

In a further processing step, the preform is subjected to a pressure-free sintering process, whereby the binder evaporates almost completely and the preform has an improved stability. That is, due the pressure-free sintering process, the density of the preform is approximately doubled. Further, the dimensions of the molding tool are correspondingly larger than the catalyst disk 5 so that the catalyst disk 5 of a defined size is obtained. In addition, the combined metal mass powder and binder may be compressed to produce the perform. Also, the flow channels may be formed in a subsequent or separate molding tool from the molding tool used to form the catalyst disk.

In addition, in accordance with a first embodiment of the present invention, all catalyst disks 5 are made of an identical catalyst material so that each catalyst disk 5 is effective in regard to the conversion of the noxious combustion substances such as hydrocarbons, carbon monoxide, and nitric oxides. However, in an alternative embodiment, at least two catalyst disks 5 can be made of different catalyst materials. For example, and with reference to FIG. 1, a first catalyst disk 5' can be made using a catalyst material such as aluminum, manganese, vanadium, molybdenum, silicon, chromium, and/or steel, which primarily catalyzes the oxidation of hydrocarbons and carbon monoxide. In addition, an adjacent second catalyst disk 5" can be made using a catalyst material such as nickel so that the reduction of nitric oxides is furthered. The catalyst disks 5 may also be coated with a noble-metal layer such as a coating of platinum, palladium, and/or rhodium to optimize the catalytic function of the disks.

Turning now to FIGS. 3-5, which illustrate an exhaust emission purification device 20 in accordance with a second embodiment of the present invention. Further, identical components of the first and second embodiments are identified with the same reference numerals. As shown in FIG. 4, the purification device 20 includes a catalyst body 21 having a tapered pipe segment 22 leading to an intake connecting piece 23, and a tapered pipe segment 22' leading to an outlet connection piece 24. The inlet and outlet connection pieces 23 and 24 connect to pipes (not illustrated) on a motor side and the exhaust pipe side, respectively.

In addition, as shown in FIG. 4, the catalyst body 21 includes a plurality of hermetically interconnected catalyst disks 25 extending between the pipe segments 22 and 22'. Further, each catalyst disk 25 in an intermediate flow area 27 is interspersed with flow channels 26 and is comparable in design to the catalyst disk 5 shown in FIGS. 1 and 2. Also, as shown in FIG. 5, each catalyst disk 25 includes on an outer rim 28, a collar segment 29 protruding from the catalyst disk 25 and a cascaded peripheral segment 30 that engage with each other such that catalyst disks 25 are joined together.

In more detail, the collar segment 29 of a first catalyst disk 25' engages with a recess in the peripheral segment 30 of an adjacent second catalyst disk 25" so that outer shell surfaces M of the collar segments 29 and the peripheral segments 30 of the catalyst disk 25' and 25" are arranged flush to one another. This arrangement results in a uniform, cross-sectionally annular shell surface M of the cylindrical catalyst body 21, whereby the outer rim 28 of the catalyst body 21 functions as a housing. Further, a thickness of the collar segment 29 and the peripheral segment 30 is approximately 2 mm to 3 mm.

In addition, as shown in FIG. 5, the peripheral segment 30 of a respective catalyst disk 25 has an axial projection 31 having a length corresponding to the axial distance "a." Thus, the catalyst disks are separated from each other by the axial distance "a." Further, the axial projection 31 has a stop surface 32 abutting a face surface of an adjacent peripheral segment 30 and which extends flush with face sides 33 of the flow channels 26.

Also, in accordance with the second embodiment of the present invention, adjacent catalyst disks 25 are attached to one another and are attached to the funnel-shaped intake and outlet connecting pieces 23 and 24, respectively, via solder, for example. Alternatively, the catalyst disks 25 can be joined together via a sintering or welding process. In addition, the funnel-shaped intake and outlet connecting pieces 23 and 24 may be connected to the catalyst disks 25 using a subsequent soldering or welding process.

Further, as shown more clearly in FIG. 4, the catalyst disks 25 are arranged so as to be twisted to one another around a defined angle in a peripheral direction so that the channel walls 13 of adjacent catalyst disks 25 intersect in the flow direction 4. This arrangement increases the generation of turbulences in the exhaust gas flowing through the catalyst body 21. In addition, the catalyst disks 25 may also be produced as described above with respect to the catalyst disks 5 of the first embodiment.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An exhaust emission purification device, comprising:
   a catalyst body including a plurality of flow channels extending between an intake side and a discharge side of the catalyst body for a passage of an exhaust gas,
   wherein the catalyst body comprises a sintered catalyst material,
   wherein the catalyst body includes a plurality of catalyst disks extending in a direction of flow of the exhaust gas, the catalyst disks being spaced from one another;
   an outer rim portion extending about each catalyst disk, at least one catalyst disk having a collar segment protruding axially from the outer rim portion; and
   an axial projection protruding from the outer rim portion for separating the catalyst disks from one another.

2. The exhaust emission purification device according to claim 1, wherein the sintered catalyst material comprises a sintered metal powder that reduces noxious combustion substances in the exhaust.

3. The exhaust emission purification device according to claim 1, wherein a first catalyst disk of the plurality of catalyst disks comprises a first catalyst material for conversion of hydrocarbons and carbon monoxide.

4. The exhaust emission purification device according to claim 3, wherein the first catalyst material is at least one material from an aluminum material, a manganese material, a vanadium material, a molybdenum material, a silicon material, a chromium material, and an iron material.

5. The exhaust emission purification device according to claim 3, wherein a second catalyst disk of the plurality of catalyst disks is arranged behind the first catalyst disk in the direction of flow of the exhaust gas and comprises a second catalyst material for conversion of nitric oxide.

6. The exhaust emission purification device according to claim 5, wherein the second catalyst material comprises a nickel material.

7. The exhaust emission purification device according to claim 5, wherein the plurality of catalyst disks are hermetically attached to one another at the outer rim portions of the plurality of catalyst disks.

8. The exhaust emission purification device according to claim 1, wherein the flow channels have a rectangular cross section with a cross-sectional area in a range between 1 mm$^2$ and 1.2 mm$^2$.

9. The exhaust emission purification device according to claim 8, wherein the flow channels are arranged in an even distribution across the cross-sectional area.

10. The exhaust emission purification device according to claim 1, wherein the flow channels are bounded by channel walls having a wall thickness of approximately 0.25 mm.

11. The exhaust emission purification device according to claim 1, wherein the plurality of catalyst disks are separated from each other by a distance of approximately 3 mm.

12. The exhaust emission purification device according to claim 1, wherein at least a portion of the plurality of catalyst disks includes a noble-metal coating layer.

13. The exhaust emission purification device according to claim 1, further comprising: a housing comprising a heat-resistance mat or a wire mesh surrounding the plurality of the catalyst disks so as to hold the plurality of catalyst disks in place.

14. The exhaust emission purification device according to claim 1, wherein the purification device is for a vehicle.

15. The exhaust emission purification device according to claim 1, wherein each of the plurality of catalyst disks has a honey-comb structure.

* * * * *